US008819268B1

(12) United States Patent
Sauer (10) Patent No.: US 8,819,268 B1
(45) Date of Patent: Aug. 26, 2014

(54) SYSTEMS AND METHODS FOR NOTIFICATION OF DEVICE MIRRORING

(71) Applicant: Google Inc., Mountain View, CA (US)

(72) Inventor: Fred Sauer, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/921,618

(22) Filed: Jun. 19, 2013

(51) Int. Cl.
*G06F 15/16* (2006.01)
*H04L 29/06* (2006.01)
*H04L 12/56* (2006.01)
*H04L 7/00* (2006.01)

(52) U.S. Cl.
CPC ......... *H04L 65/403* (2013.01); *H04T 2001/205* (2013.01); *H04L 45/70* (2013.01); *H04L 45/00* (2013.01); *H04L 29/06176* (2013.01); *H04L 47/70* (2013.01); *H04L 7/00* (2013.01); *H04L 47/15* (2013.01)
USPC ........... 709/232; 709/204; 709/213; 709/216; 709/223; 709/226; 709/238; 709/248; 348/423.1; 348/500

(58) Field of Classification Search
USPC ........................ 709/204, 205, 213, 223, 248; 348/423.1, 500
See application file for complete search history.

(56) References Cited

U.S. PATENT DOCUMENTS

| 6,414,594 | B1* | 7/2002 | Guerlain ........................ 340/506 |
| 7,155,729 | B1* | 12/2006 | Andrew et al. ................ 719/318 |
| 7,289,102 | B2* | 10/2007 | Hinckley et al. .............. 345/156 |
| 2005/0091219 | A1* | 4/2005 | Karachale et al. ............. 707/10 |
| 2007/0203998 | A1* | 8/2007 | Demsky et al. ................ 709/207 |
| 2008/0115077 | A1* | 5/2008 | Cooper et al. ................. 715/772 |
| 2012/0054616 | A1* | 3/2012 | Mittal ............................ 715/722 |
| 2012/0327106 | A1* | 12/2012 | Won et al. ..................... 345/619 |
| 2013/0097518 | A1* | 4/2013 | Pearcy .......................... 715/741 |
| 2013/0132848 | A1* | 5/2013 | Bhatt ............................. 715/733 |
| 2013/0141331 | A1* | 6/2013 | Shiu et al. ..................... 345/158 |
| 2013/0148720 | A1* | 6/2013 | Rabii ........................ 375/240.12 |
| 2013/0328878 | A1* | 12/2013 | Stahl et al. .................... 345/428 |

* cited by examiner

Primary Examiner — Michael Y Won
(74) Attorney, Agent, or Firm — Troutman Sanders LLP; James E. Schutz; Christopher W. Glass (57) ABSTRACT

The disclosed technology includes systems and methods providing event- or condition-based notifications of device mirroring responsive to one or more of changes in the physical or internal environments of a computing device, for example a mobile computing device. Moreover, some implementations may include stopping or suspending device mirroring responsive to the same. A change in the physical environment of a computing device may be determined from a change in a signal received at the device, for example a network connection signal, IR signal, or ambient light or noise level. A change in physical environment may also be determined based on a change in location or orientation of the computing device. A change in the internal environment of the computing device may include a change in the active application at the device, or a change in focus to a new application.

16 Claims, 6 Drawing Sheets

SYSTEMS AND METHODS FOR NOTIFICATION OF DEVICE MIRRORING

BACKGROUND

Screen streaming has become a popular way for users to share what they see at their own computing devices with users at other devices. The appearance of a desktop or particular application can be recorded and streamed to other users live (e.g., screen sharing) or at a later point in time (e.g., screencasting). In contrast to screenshots, which may only capture the appearance of a computer desktop or application at a particular moment in time, screen streaming can broadcast video of a user's desktop. Moreover, audio can be streamed simultaneously or later synced with a recording to provide improved narrative effect and a richer multimedia experience. As mobile computing devices (e.g., smartphones and tablets) have become more prevalent, screen streaming has spread to these devices. A common in-office scenario, for example, is the streaming of content displayed at a laptop to a larger projection screen.

However, screen streaming can be a risky affair. With live streaming or screen sharing, unanticipated events may cause certain content to be shared unwittingly. For example, a personal or inappropriate email or text message could pop up unexpectedly only to be shared with an unintended audience. Moreover, a user may simply forget that they are sharing their screen and undertake actions revealing personal or secure information. In the case of mobile computing devices, the smaller former factor and personal nature of the device can make a user more likely to forget that content is still being shared when switching between tasks, or moving to a different physical location.

SUMMARY

Some or all of the above needs may be addressed by certain implementations of the disclosed technology. Certain implementations may include providing notifications of device mirroring responsive to one or more of changes in the physical or internal environments of a computing device. Additional implementations may include stopping or suspending device mirroring responsive to the same.

According to an example implementation, a method is provided. The method may include outputting content having a first portion and a second portion for display at a first display. The content may be output by a first computing device. The method may also include outputting the second portion of the content for display at a second display. A first notification indicating the outputting of the second portion of the content for display at the second display may also be output for presentation at the first computing device. The method may yet further include determining a change in physical environment of the first computing device. Responsive to determining the change in physical environment, the method may also include outputting a second notification indicating the outputting of the second portion of the content for display at the second display.

According to another example implementation, a system is provided. The system may include at least one processor in communication with a first display and a second display, and at least one memory operatively coupled to the at least one processor and configured for storing data and instructions. The data and instructions, when executed by the at least one processor, may cause the system to output, by the at least one processor, content for display at a first display, the content from a first application currently having focus at a computing device. The data and instructions may further cause the system to output, by the at least one processor, the content for display at a second display. The data and instructions may yet further cause the system to determine, by the at least one processor, a first change in the focus at the computing device to a second application. The data and instructions may also cause the system to, responsive to determining the first change in focus, stop the output of the content for display at the second display.

According to yet another example implementation, a computer program product is provided. The computer program product may comprise a computer-readable medium that stores instructions executable by one or more processors to perform a method. The method may include outputting content for presentation at a first output device and a second output device. The method may further include determining a change in an active application at a computing device associated with the processor, and responsive to detecting the change in the active application at the computing device, outputting an indication of the outputting of the content for presentation at the second output device. The indication may be output for presentation at the computing device.

According to additional implementations, a method, system, and computer program product are provided. The method, system, and computer program product may include outputting, by a computing device, content for presentation at a first output device and a second output device. Notification content may be received for inclusion in the content for presentation while outputting the content to the first and second output devices. At least a portion of the notification content may be suppressed. Responsive to stopping the output of the content for presentation at the second output device, the suppressed notification content may be presented for presentation at the first output device. Suppressing the at least a portion of the notification content may include preventing the at least a portion of the notification content from being included in the content for presentation or otherwise output to at least one of the first or second output devices.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

The term "content" refers to information or data that may be presented at one or more displays or other output devices associated with a computing device. By way of example, content may include any one or more of text, images, videos, audio files, executables, links to executables, UI elements, windows, workspaces, desktops, and the like. In an example implementation, content may be provided by one or more services and/or applications executing on, requested by, or transmitted to a computing device.

Screen streaming allows the sharing of content between devices. In certain implementations, content appearing at a display associated with a first computing device may be recorded or streamed to another display or other device, either live or at a later point in time. Although "screen sharing" will be used herein generally to refer to instances of live screen streaming, and "screencasting" to refer to instances of delayed screen streaming of pre-recorded content, a person of ordinary skill in the art will recognize that many of the disclosed principles may apply to either scenario, or to the recording of content in general.

Some conventional screen streaming software provides a static indication that a screen streaming session is underway, for example a status icon in a menu bar. However, a user may easily still forget that they are sharing content with others, especially when switching tasks, or changing physical location. In these situations, it may be helpful to have an event- or condition-based reminder in place of, or addition to a static notification. Accordingly, certain implementations of the disclosed technology include providing notification of device mirroring responsive to one or more events or conditions, including determined changes in the physical or internal environments of a computing device.

Unanticipated events, such as the arrival and display of a new email or text message, or other incoming communication such as a voice call or video conversation, may interrupt a screen streaming session with content also unintended or inappropriate for sharing. According to certain implementations, a user may be able to block, suppress, or otherwise modify the presentation of incoming communications or notifications. For example, in one implementation, the presentation of incoming transmissions may be automatically suppressed while a screen streaming session is in progress. Suppression may be implemented at the application level, for example by disabling or blocking one or more functions of a particular application, or at the system level for example, by disabling system notifications. In another example, notifications or other interruptions may be prevented from "popping up" or being displayed over content currently being shared. In yet another example, an indication that the user is busy, or otherwise occupied, may be automatically sent in response to an incoming transmission.

Examples of suppressed transmissions may include voice mails, video chats, text messages, emails, etc. In some implementations, the suppressed notifications can be saved for presentation at a later point in time, for example, for presentation after a streaming session has ended. Alternatively, notifications associated with these transmissions may be discarded without being preserved for later presentation.

In another implementation, select types of notifications may be suppressed. For example, time-based notifications and events such as calendar reminders could be suppressed while email notifications may be at least partially allowed. Also, the way notifications are displayed may be changed, for example, displaying only part of an incoming transmission or notification. For example, a text message notification may be modified to show only the sender and not the body of the message. Alternatively, a notification could be pared down to show the presence of a new message without revealing any identifying information about the sender. Thus, potentially sensitive information may be hidden or removed from a notification or displayed message.

According to another implementation, a notification or message may be presented in a first, or unsuppressed form, at a primary display or other output device, and the suppressed version of the notification may be presented at one or more secondary displays.

However, in some situations, an incoming message or notification may be more urgent or important than the screen streaming session. Even with only partial suppression of messages, a user may still miss a message conveying an emergency or otherwise requiring urgent attention from the user. Thus, in some situations it may be advantageous to stop or pause the screen streaming session instead of, or in addition, to suppressing the notification or message, so that a user may privately view the notification. Accordingly, certain implementations of the disclosed technology include automatically stopping or suspending a screen streaming session responsive to one or more events or conditions, including determined changes in the physical or internal environments of a computing device.

Various systems and methods may be utilized for notification of device mirroring, according to example implementations of the disclosed technology, and will now be described with reference to the accompanying figures.

Figure 1:
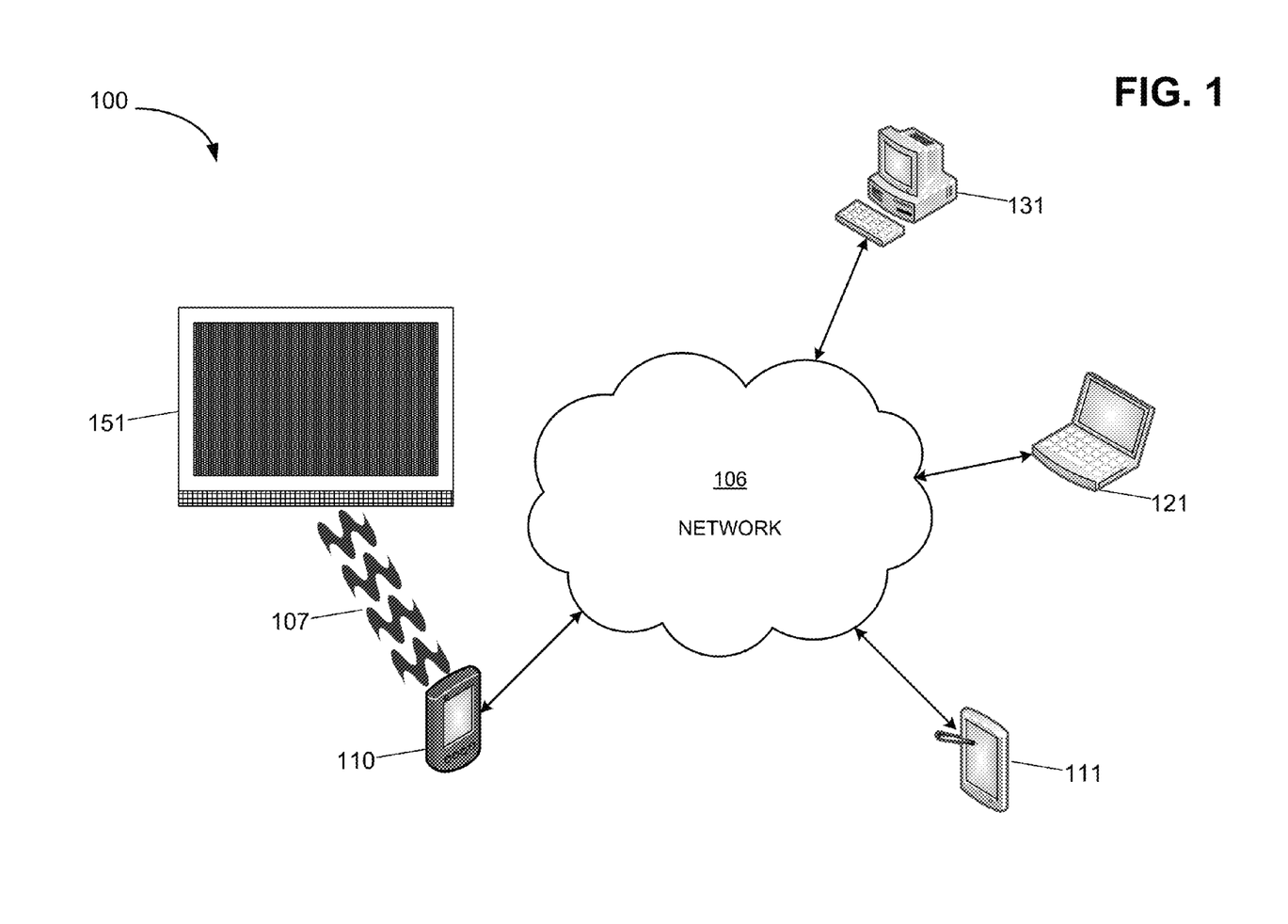
FIG. 1 is a block diagram of an example device mirroring notification system 100, according to an example implementation.

FIG. 1 is a block diagram of an example device mirroring notification system 100, according to an example implementation. In certain implementations, the device mirroring notification system may include a primary computing device 110 and one or more secondary devices 111, 121, 131, 151 in communication with the primary computing device. As shown in FIG. 1, one or more of the primary computing device and secondary devices may be a mobile computing device, for example, a smartphone or a tablet. The mobile computing device may have a built-in or integrated display for presenting content to a user. The display of the mobile device may be a touch-sensitive or presence-sensitive display device for also receiving user input from a stylus, fingertip, or other means of gesture input. The primary computing device may also be operatively coupled with a separate presence-sensitive input device. In another implementation, one or more of the primary computing device and secondary devices may be a non-mobile computing device, for example, a personal computer, with an internal or external display operatively connected. In yet another implementation, a secondary device may be a display device, such as an LCD TV or projector.

In certain implementations, the secondary devices 111, 121, 131, 151 may be in communication with the primary computing device 110 through a network 106, as shown by secondary devices 111, 121, 131 in FIG. 1. The network may be, for example and not limitation, a local area network, a wide area network, or the Internet. The primary computing device 110 may also be in direct communication 107 with a secondary device, as shown by secondary device 151. The direct connection may be, for example and not limitation, a wireless device-to-device link or wired connection.

Figure 2:
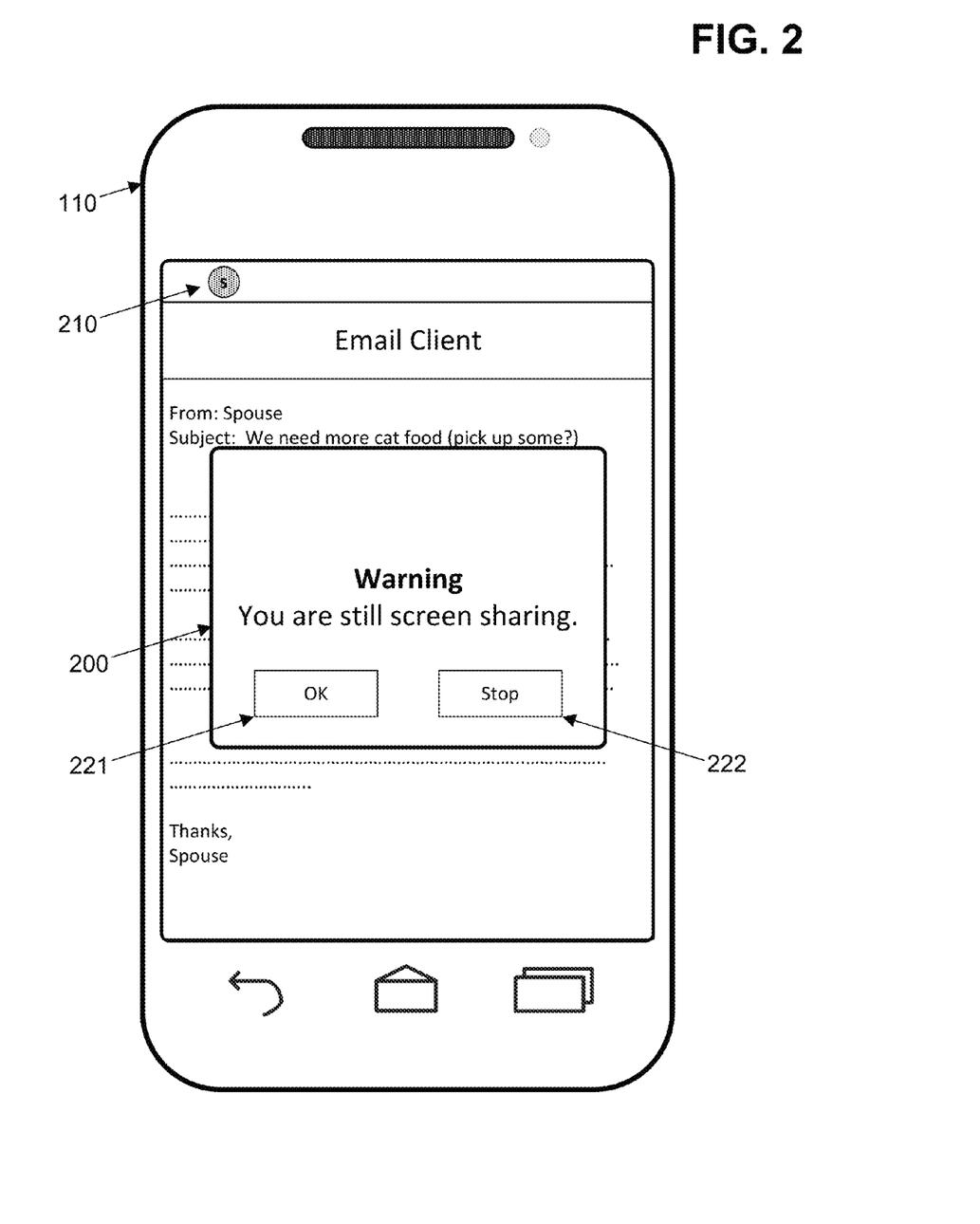
FIG. 2 is a illustrative diagram of an example notification 200 presented at a mobile computing device, according to an example implementation.

Certain implementations of the disclosed technology may provide a user notification or other indication that content is still being mirrored at a second display responsive to an event or condition. FIG. 2 is a illustrative diagram of an example notification 200 presented at a mobile computing device, according to an example implementation. As shown in FIG. 2, the notification may be presented for display at a mobile computing device. In another implementation, the notification may instead, or also be, aural or tactile. Notifications having aural or tactile elements may be especially effective when an interrupting event may cause the user to take his view away from a display associated with the primary computing device 110, for example, when answering a call on a smartphone; or when the user's attention is already directed to another display, for example, when using a larger projection screen currently displaying the shared content. Various other ways for presenting notifications at a computing device will be obvious to a person of ordinary skill in the art. In another implementation, the notification 200 may be provided in addition to a static icon 210 or other persistent indication that a screen streaming session has started.

In some implementations, a notification may function as a dialog, allowing a user to adjust the sharing session from the notification. As shown in FIG. 2, the example notification provides two button-type interface elements 221 222. The first button 221 may allow a user to acknowledge that content is still being shared and continue with the session. The second button 222 may allow a user to terminate or end the sharing session from the dialog.

In some implementations, an affirmative action from the user may be needed to dismiss the dialog or otherwise cause the notification to be hidden or removed, for example, a user selection associated with one of the provided buttons 221 222. In another implementation, the notification may automatically be hidden or be dismissed after a predetermined time. In yet another implementation, a notification may automatically disappear when the event or condition that triggered the notification no longer exists. For example, if the notification was triggered in response to a computing device being removed from a prescribed area, the notification may automatically disappear or cease when the computing device is brought back within the prescribed area.

According to certain implementations, a notification may be triggered responsive to changes in the physical environment of the primary computing device 110. For example, in one scenario, a user leading a presentation in a conference room may receive a phone call causing the user to exit the conference room to answer the call. The resultant change in physical environment may be determined by a detected change in a signal received at the primary computing device.

For example, the primary computing device 110 may be a mobile computing device sharing content over a wireless network 106. As the mobile computing device is moved further away from other network nodes (e.g., a secondary device or network hub), signal attenuation and other deviations in the network signal profile may occur. Moreover, exiting a room may also place obstacles such as walls in the path of communication, resulting in further attenuation.

In another example scenario, a user may place a mobile phone still sharing content in his pocket at the end of a presentation. Placement underneath a table or under the fabric of a user's garment may cause an ascertainable change in the network signal received at the device. The user of the device may then be alerted that content is still being shared from the mobile device, for example by tactile feedback.

Signal attenuation may result in various effects including the delaying, dropping, and rerouting of network packets. A person of ordinary skill in the art will appreciate how changes in signal profile may be used to determine various information about the primary computing device 110, including estimating changes in proximity to a secondary device or signal source.

The type of signal received need not be limited to network signals. Suitable signal types may include light, IR, and various other forms of electromagnetic radiation. Even, sound, or other forms of propagating mechanical energy may be used effectively. Moreover, the signals received at the primary computing device 110 need not be generated by a network node or device in direct communication with the primary computing device. In one implementation, the received signal may originate from an ambient source. For example, a change in physical environment may be determined by detecting a change in ambient light received as the user exits a lit conference room, or when the user places the mobile device in a bag or case. In another implementation, a dedicated signal generator may be used, for example, such that a notification is triggered whenever a device still sharing content exits a predetermined range of the signal.

In some implementations, the determined change in physical environment may be a change in location or orientation of the primary computing device. For example, exiting a room to respond to an urgent email may result in a significant displacement of the mobile device from the location when content sharing first occurred. In another example, a user bringing a smartphone to his ear to answer a call may result in a significant shift in orientation of the mobile device. In various implementations, changes in location and orientation may be detected by accelerometers, gyroscopes, and the like. A person of ordinary skill in the art will be familiar with various way for detecting such changes.

According to certain implementations, a notification may be triggered responsive to changes in the internal environment of the primary computing device 110. For example, in one scenario, a user screen streaming from a smartphone may receive a text message causing a text message dialog to appear. The resultant change in internal environment may be determined by a detected change in the active application at the smartphone, or a change in which application has focus at the device. In some implementations, the change in focus may be a change in application focus, audio focus or both.

In some implementations, a notification may be triggered based on the change in focus being to a specific application, for example: an email client; text message app; or voice call interface, or to specific types or groups of applications. In one implementation, a group of applications may be a predetermined group specified by the system or defined by the user. In another implementation, an activation of applications or application functionality for entering secure data may trigger a notification.

According to certain implementations, device mirroring may be stopped or paused responsive to the changes in physical and internal environment previously described herein. Stopping a screen streaming session may be prudent when a notification would be not effective in preventing the unintended sharing of content, for example, when a user would not have sufficient time to react before sensitive data becomes available for display and shared. For example, some text message applications may automatically display the contents of incoming text messages over whatever application is currently running.

Figure 3:
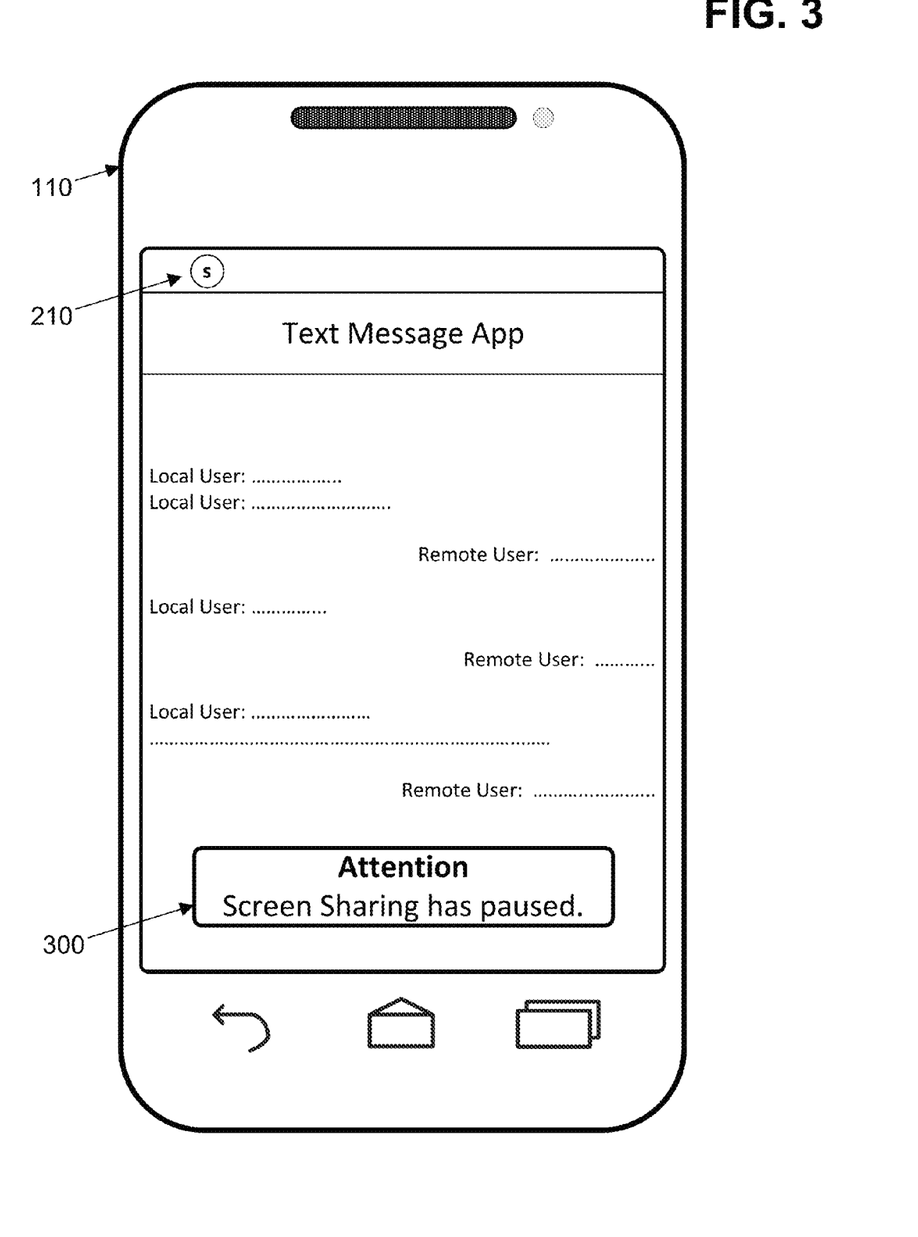
FIG. 3 is a illustrative diagram of another example notification 300 presented at a mobile computing device, according to an example implementation.

A user recording a screen cast may also appreciate the ability to automatically pause the recording session as interruptions arise, preventing the user from having to restart or edit the recording to remove the interruptions before sharing the recorded session. In some implementations, a notification 300 at the primary computing device 110 may be triggered indicating that the screen streaming session has been automatically ended or suspended. In another implementation, a notification may be triggered for presentation at secondary devices indicating the same.

In some implementations, the screen streaming session may be automatically restarted or resumed once the triggering event or condition has passed. For example, in one scenario, an incoming text message to a smartphone could cause the streaming session in progress to be suspended. After the user answers or otherwise dismisses the text message dialog, the sharing session could automatically resume. In one implementation, a screen streaming session may resume when the active application or focus changes back to the initial application before the triggering event or condition. In another implementation, a sharing session may automatically resume a predetermined amount of time after the condition is no longer present.

Figure 4:
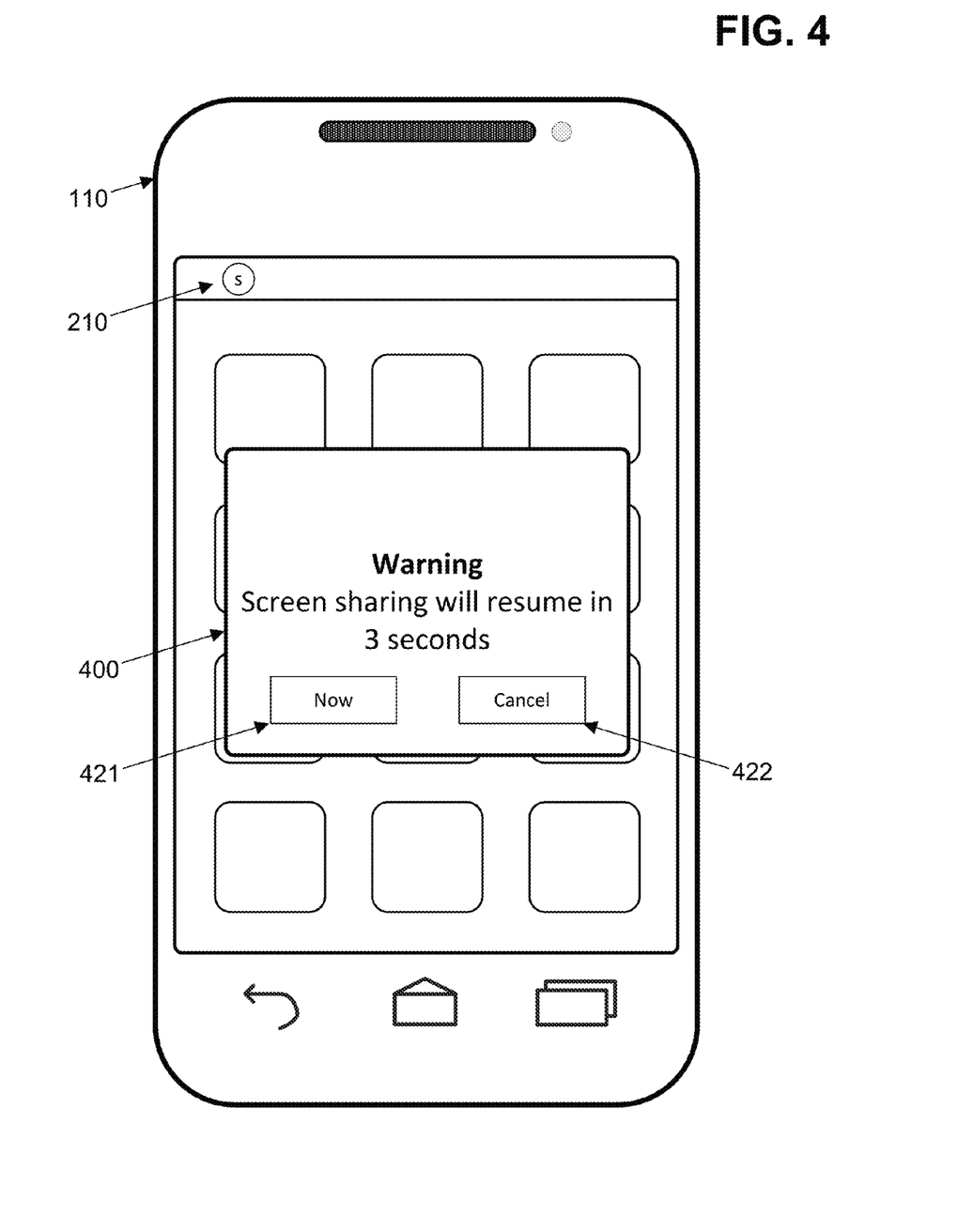
FIG. 4 is a illustrative diagram of yet another example notification 400 presented at a mobile computing device, according to an example implementation.

As shown in FIG. 4, a notification 400 may be triggered indicating that a screen streaming session will resume after a predetermined amount of time. The notification may also indicate the time remaining until the session resumes. In some implementations, a notification may function as a dialog, allowing a user to adjust the sharing session from the notification. As shown in FIG. 4, the example notification provides two button interface elements 421 422. The first button 421 may allow a user to immediately restart or resume the screen streaming session. The second button 422 may allow a user to cancel or prevent the screen streaming session from continuing.

Figure 5:
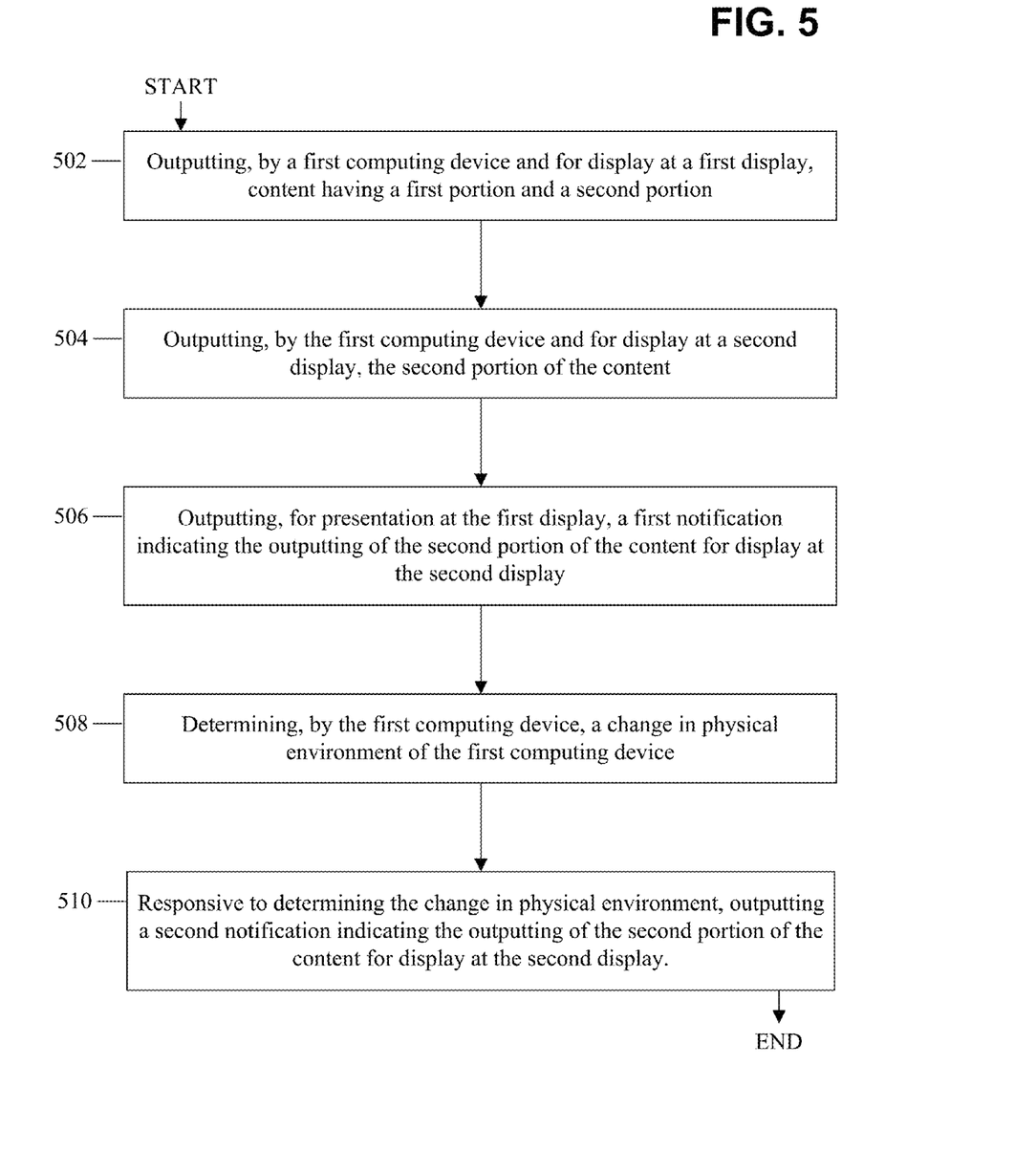
FIG. 5 is a flow diagram of a method 500 for notification of device mirroring, according to an implementation.

FIG. 5 is a flow diagram of a method 500 for notification of device mirroring, according to an implementation. As shown in FIG. 5, the method 500 starts in block 502, and according to an example implementation includes outputting, by a first computing device and for display at a first display, content having a first portion and a second portion. In block 504, the method 500 includes outputting, by the first computing device and for display at a second display, the second portion of the content. In block 506, the method 500 includes outputting, for presentation at the first display, a first notification indicating the outputting of the second portion of the content for display at the second display. In block 508, the method 500 includes determining, by the first computing device, a change in physical environment of the first computing device. In block 510, the method 500 includes, responsive to determining the change in physical environment, outputting a second notification indicating the outputting of the second portion of the content for display at the second display.

It will be understood that the various steps shown in FIG. 5 are illustrative only, and that steps may be removed, other steps may be used, or the order of steps may be modified.

Various implementations of the device mirroring notification systems and methods disclosed herein may be embodied in non-transitory computer readable media for execution by a processor. An example implementation may be used in an application of a mobile computing device, such as a smartphone, tablet, or wearable, swallowable, or embeddable computing devices. Other computing devices may also be used, such as portable computers, tablet PCs, Internet tablets, PDAs, ultra mobile PCs (UMPCs), etc.

Figure 6:
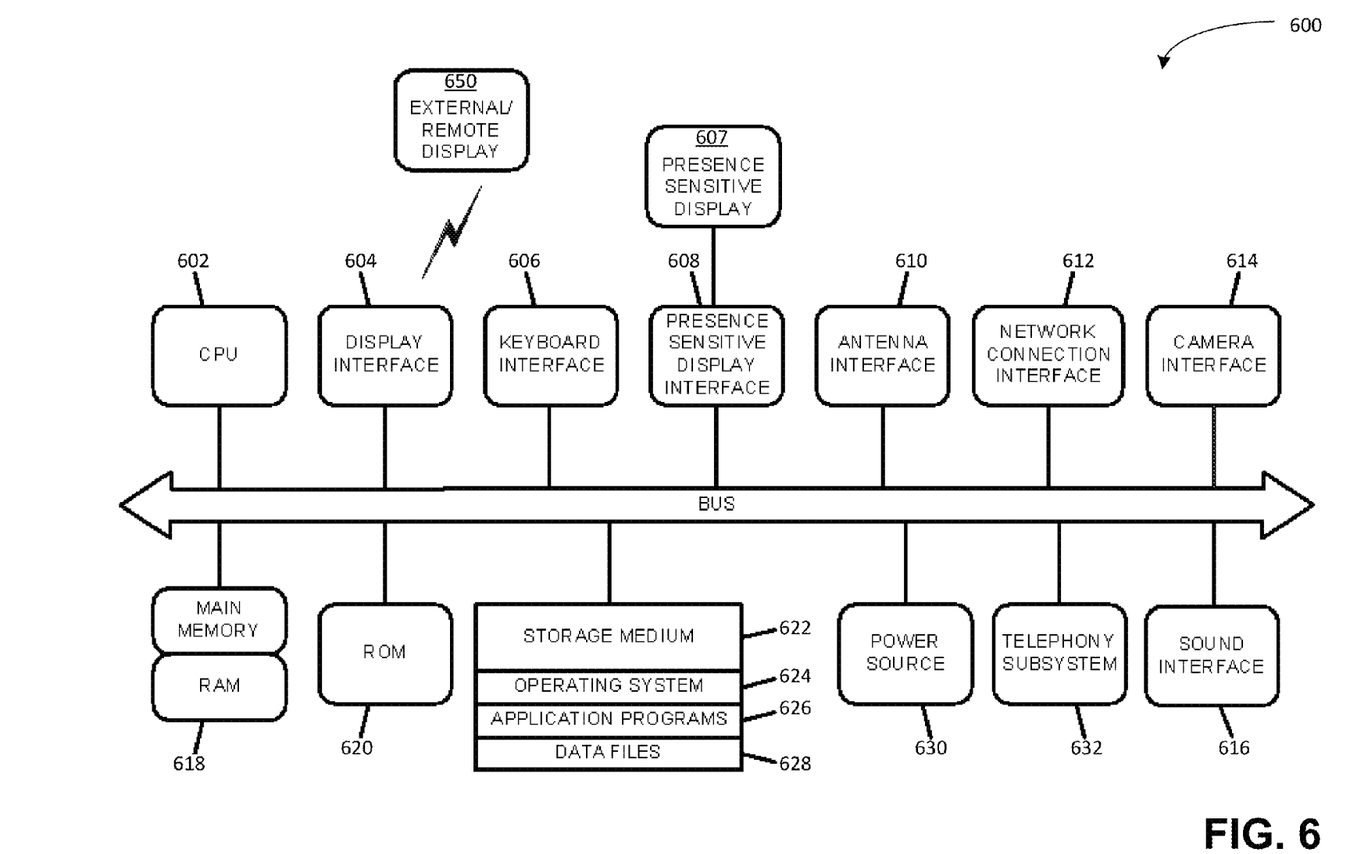
FIG. 6 depicts a block diagram of an illustrative computing device architecture 600, according to an example implementation.

FIG. 6 depicts a block diagram of an illustrative computing device architecture 600, according to an example implementation. Certain aspects of FIG. 6 may be embodied in a computing device (for example, the primary computing device 110 or secondary devices 111, 121, 131, 151 as shown in FIG. 1). Various implementations and methods herein may be embodied in non-transitory computer readable media for execution by a processor. It will be understood that the computing device architecture 600 is provided for example purposes only and does not limit the scope of the various implementations of the device mirroring notification systems and methods.

The computing device architecture 600 of FIG. 6 includes a central processing unit (CPU) 602, where computer instructions are processed; a display interface 604 that acts as a communication interface and provides functions for rendering video, graphics, images, and texts on the display. In certain example implementations of the disclosed technology, the display interface 604 may be directly connected to a local display, such as a touch-screen display associated with a mobile computing device. In another example implementation, the display interface 604 may be configured for providing data, images, and other information for an external/remote display 650 that is not necessarily physically connected to the mobile computing device. For example, a desktop monitor may be utilized for mirroring graphics and other information that is presented on a mobile computing device. In certain example implementations, the display interface 604 may wirelessly communicate, for example, via a Wi-Fi channel or other available network connection interface 612 to the external/remote display 650.

In an example implementation, the network connection interface 612 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 604 may be operatively coupled to a local display, such as a touch-screen display associated with a mobile device. In another example, the display interface 604 may be configured to provide video, graphics, images, text, other information, or any combination thereof for an external/remote display 650 that is not necessarily connected to the mobile computing device. In one example, a desktop monitor may be utilized for mirroring or extending graphical information that may be presented on a mobile device. In another example, the display interface 604 may wirelessly communicate, for example, via the network connection interface 612 such as a Wi-Fi transceiver to the external/remote display 650.

The computing device architecture 600 may include a keyboard interface 606 that provides a communication interface to a keyboard. In one example implementation, the computing device architecture 600 may include a presence-sensitive display interface 608 for connecting to a presence-sensitive display 607. According to certain example implementations of the disclosed technology, the presence-sensitive display interface 608 may provide a communication interface to various devices such as a pointing device, a touch screen, a depth camera, etc. which may or may not be associated with a display.

The computing device architecture 600 may be configured to use an input device via one or more of input/output interfaces (for example, the keyboard interface 606, the display interface 604, the presence sensitive display interface 608, network connection interface 612, camera interface 614, sound interface 616, etc.,) to allow a user to capture information into the computing device architecture 600. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 600 or may be a separate device. For example, the input device may be an accelerometer, a magnetometer, a digital camera, a microphone, and an optical sensor.

Example implementations of the computing device architecture 600 may include an antenna interface 610 that provides a communication interface to an antenna; a network connection interface 612 that provides a communication interface to a network. As mentioned above, the display interface 604 may be in communication with the network connection interface 612, for example, to provide information for display on a remote display that is not directly connected or attached to the system. In certain implementations, a camera interface 614 is provided that acts as a communication interface and provides functions for capturing digital images from a camera. In certain implementations, a sound interface 616 is provided as a communication interface for converting sound into electrical signals using a microphone and for converting electrical signals into sound using a speaker. According to example implementations, a random access memory (RAM) 618 is provided, where computer instructions and data may be stored in a volatile memory device for processing by the CPU 602.

According to an example implementation, the computing device architecture 600 includes a read-only memory (ROM) 620 where invariant low-level system code or data for basic system functions such as basic input and output (I/O), startup, or reception of keystrokes from a keyboard are stored in a non-volatile memory device. According to an example implementation, the computing device architecture 600 includes a storage medium 622 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 624, application programs 626 (including, for example, a web browser application, a widget or gadget engine, and or other applications, as necessary) and data files 628 are stored. According to an example implementation, the computing device architecture 600 includes a power source 630 that provides an appropriate alternating current (AC) or direct current (DC) to power components. According to an example implementation, the computing device architecture 600 includes and a telephony subsystem 632 that allows the device 600 to transmit and receive sound over a telephone network. The constituent devices and the CPU 602 communicate with each other over a bus 634.

In accordance with an example implementation, the CPU 602 has appropriate structure to be a computer processor. In one arrangement, the computer CPU 602 may include more than one processing unit. The RAM 618 interfaces with the computer bus 634 to provide quick RAM storage to the CPU 602 during the execution of software programs such as the operating system application programs, and device drivers. More specifically, the CPU 602 loads computer-executable process steps from the storage medium 622 or other media into a field of the RAM 618 in order to execute software programs. Data may be stored in the RAM 618, where the data may be accessed by the computer CPU 602 during execution. In one example configuration, the device architecture 600 includes at least 128 MB of RAM, and 256 MB of flash memory.

The storage medium 622 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a to access computer-executable process steps, application programs and the like, stored on removable and non-removable memory media, to off-load data from the device or to upload data onto the device. A computer program product, such as one utilizing a communication system may be tangibly embodied in storage medium 622, which may comprise a machine-readable storage medium.

According to one example implementation, the term computing device, as used herein, may be a CPU, or conceptualized as a CPU (for example, the CPU 602 of FIG. 6). In this example implementation, the computing device (CPU) may be coupled, connected, and/or in communication with one or more peripheral devices, such as display. In another example implementation, the term computing device, as used herein, may refer to a mobile computing device, such as a smartphone 110 or tablet computer 111. In this example embodiment, the computing device may output content to its local display and/or speaker(s). In another example implementation, the computing device may output content to an external display device (e.g., over Wi-Fi) such as a TV or an external computing system.

In example implementations of the disclosed technology, the primary computing device 110 and/or secondary devices 111, 121, 131, 151 may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include a computing device with more or less of the components illustrated in FIG. 6.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer-implemented method comprising:
outputting, by a first computing device and for display at a first display, a first portion of content and a second portion of the content;
outputting, by the first computing device and for display at a second display, the second portion of the content;
responsive to, and throughout a duration of, the outputting of the second portion of the content for display at the second display, outputting, for display at the first display, a first persistent notification indicating the outputting of the second portion of the content for display at the second display;
detecting, by the first computing device, a change in physical environment of the first computing device; and
responsive to detecting the change in physical environment, outputting, for display at the first display but not the second display, a second transient notification indicating the outputting of the second portion of the content for display at the second display.

2. The method of claim 1, the detecting the change in physical environment comprising determining a change in a signal received at the first computing device.

3. The method of claim 2, the received signal comprising one or more packets transmitted over a network connection.

4. The method of claim 2, the received signal transmitted from a second computing device associated with the second display.

5. The method of claim 1, the detecting the change in physical environment comprising detecting a change in orientation of the first computing device.

6. The method of claim 1, the detecting the change in physical environment comprising detecting a change in location of the first computing device.

7. The method of claim 1, the change in signal indicating that a second device is within a predefined distance of the first computing device.

8. The method of claim 1, further comprising stopping the outputting of the second portion of the content for display at the second display.

9. A system comprising:
at least one processor in communication with a first display and a second display; and
at least one memory operatively coupled to the at least one processor and configured for storing data and instructions that, when executed by the at least one processor, cause the system to:
output, by the at least one processor, content for display at a first display, the content being associated with a first application currently having focus at a computing device;
output, by the at least one processor, the content for display at a second display;
detect, by the at least one processor and during the output of the content for display at the second display, a first change in the focus at the computing device to a second application;
responsive to detecting the first change in focus, stop the output of the content for display at the second display; and
responsive to detecting a second change in the focus, back to the first application, cause the system to resume outputting the content for display at the second display.

10. The system of claim 9, the change in focus being a change in application focus.

11. The system of claim 9, the change in focus being a change in audio focus.

12. The system of claim 9, the second application comprising a user interface for receiving a voice call.

13. The system of claim 9, the stored data and instructions further causing the system to output a first user notification indicating the stopping of the output of the content for display at the second display.

14. The system of claim 9, the resuming the outputting of the content for display at the second display responsive to detecting a second change in the focus back to the first application occurring a predetermined amount of time after the detected second change.

15. A computer program product comprising a non-transitory computer-readable medium that stores instructions executable by one or more processors to perform a method, the method comprising:
outputting, by a processor, content for presentation at a first output device;
outputting, by the processor, the content for presentation at a second output device;
detecting, by the processor and during the outputting of the content for presentation at the second output device, a change in an active application at a computing device associated with the processor;
responsive to detecting the change in the active application at the computing device, outputting, for presentation at the computing device, an indication of the outputting of the content for presentation at the second output device; and detecting a second change in the active application at the computing device, wherein the indication persists until the second change in the active application.

16. The method of claim 15, the change in the active application comprising a change from a first application to a second application, the second application being one of a predetermined group of applications.

* * * * *